US 11,194,457 B1

(12) United States Patent
Chiang et al.

(10) Patent No.: US 11,194,457 B1
(45) Date of Patent: Dec. 7, 2021

(54) KNOWLEDGE ENGINE AUTO-GENERATION OF GUIDED FLOW EXPERIENCE

(71) Applicant: INTUIT INC., Mountain View, CA (US)

(72) Inventors: Justin Rui Chang Chiang, San Diego, CA (US); Maria Regina Villanueva Garcia, Cupertino, CA (US); Kevin M. McCluskey, Carlsbad, CA (US); Nankun Huang, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/006,026

(22) Filed: Aug. 28, 2020

(51) Int. Cl.
*G06F 3/0484* (2013.01)
*G06F 3/0483* (2013.01)
*G06F 9/54* (2006.01)
*G06F 40/183* (2020.01)
*G06F 3/0482* (2013.01)

(52) U.S. Cl.
CPC ........ *G06F 3/04845* (2013.01); *G06F 3/0482* (2013.01); *G06F 3/0483* (2013.01); *G06F 9/542* (2013.01); *G06F 40/183* (2020.01)

(58) Field of Classification Search
CPC .... G06F 3/04845; G06F 9/542; G06F 3/0482; G06F 40/183; G06F 3/0483
See application file for complete search history.

(56) References Cited

U.S. PATENT DOCUMENTS

| | | | |
|---|---|---|---|
| 9,678,936 B2 | 6/2017 | Sivertson et al. | |
| 9,916,628 B1 | 3/2018 | Wang et al. | |
| 10,417,717 B2 | 9/2019 | Yu et al. | |
| 10,664,926 B2 | 5/2020 | Wang et al. | |
| 2016/0147761 A1 | 5/2016 | Sivertson et al. | |
| 2019/0146998 A1* | 5/2019 | Jin | G06F 9/46 718/104 |
| 2019/0347268 A1* | 11/2019 | Griffith | G06F 16/221 |

OTHER PUBLICATIONS

TurboTax CTO: Data intelligience, mobile are behind strong 2016 tax season, ZDNet, https://www.zdnet.com/article/turbotax-cto-data-intelligence-mobile-are-behind-strong-2016-tax-season/, Apr. 27, 2016, 4 pages.

* cited by examiner

*Primary Examiner* — Pei Yong Weng
(74) *Attorney, Agent, or Firm* — Patterson + Sheridan, LLP

(57) ABSTRACT

Certain aspects of the present disclosure provide techniques for generating a user experience for a software program product based on a knowledge engine. Techniques for generating the user experience include a UI builder tool providing a set of tabular UI views and receiving in each tabular UI view corresponding input data for generating a calculation graph, a completeness graph, and a client UI view. Based on the input data, the UI builder tool and knowledge engine can generate a set of artifact files. The knowledge engine can generate and/or execute the calculation and completeness graphs as defined in the corresponding artifact files. The UI builder tool can generate an instance of the client UI view. With the generated calculation graph(s), completeness graph(s), and an instance of the client UI view, the user experience can be provided to a computing device.

20 Claims, 11 Drawing Sheets

| | A | B | C | D | E | F | G | H | I | J | K |
|---|---|---|---|---|---|---|---|---|---|---|---|
| 1 | format calc | | | | | | You can also explore the notes in the headers of each tab. Look for the black triangle at the top right of the cell! | | | | |
| 2 | | | | For help go to this sheet!! | | | | | | | |
| 3 | role | type | Options | friendly name (display name) | field (internal name) | expression (calculation) | Decimal Precision | Explanation Debugger | Question Debugger | | Explanation Co (Author Explana |
| 4 | input | decimal | ▷ | the number you entered | InputNumber | | | | | | |
| 5 | constant | decimal | ▷ | the number one | One | $15.00 | | | | | |
| 6 | calc | decimal | ▷ | the result | NumberPlusOne | $1.00 | | | | | |
| 7 | | | ▷ | | | $16.00 | | | | | |
| 8 | | | ▷ | | | | | | | | |
| 9 | | | ▷ | | | | | | | | |
| 10 | | | ▷ | | | | | | | | |
| 11 | | | ▷ | | | | | | | | |
| 12 | | | ▷ | | | | | | | | |
| 13 | | | ▷ | | | | | | | | |
| 14 | | | ▷ | | | | | | | | |
| 15 | | | ▷ | | | | | | | | |
| 16 | | | ▷ | | | | | | | | |
| 17 | | | ▷ | | | | | | | | |
| 18 | | | ▷ | | | | | | | | |
| 19 | | | ▷ | | | | | | | | |
| 20 | | | ▷ | | | | | | | | |
| 21 | | | ▷ | | | | | | | | |
| 22 | | | ▷ | | | | | | | | |
| 23 | | | ▷ | | | | | | | | |
| 24 | | | ▷ | | | | | | | | |
| 25 | | | ▷ | | | | | | | | |
| 26 | | | ▷ | | | | | | | | |
| 27 | | | ▷ | | | | | | | | |
| 28 | | | ▷ | | | | | | | | |
| 29 | | | ▷ | | | | | | | | |

| + | ☐ | Calculation ▷ | UX ▷ | Completeness ▷ | Testing ▷ |

| | A | B | C | D | E | F |
|---|---|---|---|---|---|---|
| 1 | nodeid | type | Screen Title | Subtitle / label for the field | options (for booleans) | output/calc result |
| 2 | InputNumber | number | Hello World! | What's the number you want to add 1 to? We'll do the heavy lifting! | | |
| 3 | | | | | | |
| 4 | Screen_NumberPlusOne | screen | Congrats | Here's the result of your number + 1: $${NumberPlusOne} | | NumberPlusOne |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | | | | | | |
| 21 | | | | | | |
| 22 | | | | | | |
| 23 | | | | | | |
| 24 | | | | | | |
| 25 | | | | | | |
| 26 | | | | | | |
| 27 | | | | | | |
| 28 | | | | | | |

Calculation ▸ | UX ▸ | Completeness ▸ | Testing ▸

Module Details

- Artifacts
  - blob
  - calc
    - constants
    - Demo
  - calc-test
  - completeness
    - Demo_compiled
  - completeness-test
  - constant
    - fdl-constants
  - derived-gist
    - And
    - Booleanif
    - LimitToNonNegative
    - Not
    - Numericlf
    - Or
    - StringIf
  - explanation
    - Demo-exdetail
    - explanation-template
    - Demo-extemplate
  - mock-data
    - input
    - model
  - module-collection
    - schema
    - schema
  - schema
    - InputNumber
    - KEScreenMappings
    - Screen_NumberPlusOne KE Pipeline DEMO | DETAILS Demo | Demo_compiled ✕ | InputNumber ✕

```
Demo
  1  <es_topic="Demo">
  2   <Versions>
  3     <Version id="TKE.Calc.Runtime">1</Version>
  4     <Version id="TKE.Calc.FileFormat">6</Version>
  5     <Version id="TKE.Gist">1</Version>
  6     <Version id="TKE.Mef">1</Version>
  7   </Versions>
  8   <Node name="KE/Demo/NumberPlusOne">
  9     <Inputs>
 10       <Input>/KE/Demo/InputNumber</Input>
 11       <Input>/Constants/KE/One</Input>
 12     </Inputs>
 13     <Gist>
 14       <Accumulation>
 15         <InputRoles>
 16           <Value>/KE/Demo/InputNumber</Value>
 17           <Value>/Constants/KE/One</Value>
 18         </InputRoles>
 19       </Accumulation>
 20     </Gist>
 21     <PostProcessing>
 22       <ZeroIfBlank/>
 23     </PostProcessing>
 24   </Node>
 25   <InputNode name="KE/Demo/InputNumber">
 26   </InputNode>
 27 </Nodes>
```

FIG. 5

| | A | B | C | D | E | F | G | H | I | J | K | L | M | N |
|---|---|---|---|---|---|---|---|---|---|---|---|---|---|---|
| 1 | TestCaseID | Pass1 | Pass2 | Fail | | | | | | | | | | |
| 2 | Description | | | | | | | | | | | | | |
| 3 | Parameters | | | | | | | | | | | | | |
| 4 | Topic | | | | | | | | | | | | | |
| 5 | | | | | | | | | | | | | | |
| 6 | Inputs | | | | | | | | | | | | | |
| 7 | /KE/textarea/inputNumber | 10 | 12 | 10 | | | | | | | | | | |
| 8 | | | | | | | | | | | | | | |
| 9 | | | | | | | | | | | | | | |
| 10 | Asserts | | | | | | | | | | | | | |
| 11 | /KE/textarea/NumberPlusOne | 11 | 13 | 14 | | | | | | | | | | |
| 12 | Pass/Fail Status | PASSED | PASSED | FAILED | | | | | | | | | | |
| 13 | | | | | | | | | | | | | | |
| 14 | | | | `<?xml version="1.0"?>`<br>`<KE xmlns="http://www.irs.gov/efile">`<br>`<textarea>`<br>`<NumberPlusOne>14.00</NumberPlusOne>`<br>`</textarea>`<br>`</KE>` | | | | | | | | | | |
| 15 | | | | | | | | | | | | | | |

600

Calculation ▼  UX ▼  Completeness ▼  Testing ▼

Hello World!

What's the number you want to add 1 to? We'll do the heavy lifting!

[         ]

[ Next ]

Hello World!

What's the number you want to add 1 to? We'll do the heavy lifting!

[   10   ]

[ Next ]

Congrats!

Here is the result of your number + 1:

[   11   ]

[ Next ]

FIG. 7C

KNOWLEDGE ENGINE AUTO-GENERATION OF GUIDED FLOW EXPERIENCE

INTRODUCTION

Aspects of the present disclosure relate to generating a user experience based on a knowledge engine.

BACKGROUND

Organizations, such as businesses (e.g., for profit, non-profit, etc.), governing authorities (e.g., country, state, county, city, etc.), and other such entities have implemented compliance regimes with the assistance of a knowledge engine. In some cases, an organization can implement a compliance regime through a software program product that includes a knowledge engine service.

A compliance regime can include rules and regulations associated with knowledge domain(s), including tax, finance, accounting, health care, data protection, and so forth. The knowledge engine can include calculation (calc) and completeness graphs, which are representative of the rules and regulations of the compliance regime, capable of implementing the compliance regime. A calc graph and a completeness graph each can include a set of nodes that are encoded with related content. A calc graph uses calculations that are part of the compliance regime as its nodes to generate a result, and a completeness graph can determine whether any information needed for compliance is missing.

For example, in the instance of a tax compliance regime, an organization can implement a software program product that includes a knowledge engine (e.g., as a service). The completeness graph(s) of the knowledge engine can determine what inputs are needed and if all of the inputs have been received, while the calc graph(s) generates a complete tax calculation (e.g., for a completed annual tax return, using data required by the completeness graph such as number of dependents, income, etc.) within the software program product.

Compliance regimes are not static, and new rules and regulations can be added (at any time and for any reason) to expand and/or modify the compliance regime. For an organization that implements a compliance regime, any changes in the rules and regulations include adding and/or modifying the calc and completeness graphs. To do so, for example, involves modifying a software program product to include the latest rules and regulations for an up-to-date and accurate user experience that meets the compliance regime.

Conventional methods for adding and/or modifying calc and completeness graphs are resource-intensive (e.g., time, money, computing, personnel, etc.). For example, the tools available to a subject matter expert for updating a software program product require a deep understanding of the tools, programming language, etc. In some cases, it may take weeks or months to generate and on-board the calc and completeness graphs to the software program product using the available tools. In that time, the rules and regulations may have changed even further, ultimately resulting in a software program product that is not up-to-date and negatively impacting the user experience.

Further, conventional methods for adding and/or modifying calc and completeness graphs lack the ability to provide a subject matter expert that is authoring the revisions to the software program product a visualization (or a preview) of the user experience. As such, the subject matter expert may not realize an error in the user experience when generating the calc and completeness graphs until the user experience is actually implemented in the software program product for use by users. This, in turn, is a further drain on the resources of an organization.

Therefore, a solution is needed that can overcome the shortcomings of the conventional methods so as to generate a user experience (e.g., of a software program product), based on the knowledge engine, without monopolizing resources.

BRIEF SUMMARY

Certain embodiments provide a method, for example, to generate a user experience based on a knowledge engine. The method includes providing access to a first computing device to a set of tabular user interface (UI) views. The method further includes receiving input from the first computing device, wherein the input includes: a first input from a first tabular UI view to generate a calculation graph including: a plurality of node descriptions and a selection of one or more corresponding to a knowledge engine, wherein each operation defines a relationship between the plurality of node descriptions; a second input from a second tabular UI view to generate a completeness graph that includes each node of the plurality of node descriptions of the calculation graph to carry out an operation defined by the relationship; and a third input from a third tabular UI view to generate a client UI view for a second computing device. The method further includes generating via the knowledge engine the calculation graph and the completeness graph as defined by the input. The method further includes executing the calculation graph and the completeness graph. The method further includes generating the client UI view for the second computing device based on the input from the first computing device. The method further includes displaying the client UI view in the second computing device.

Certain embodiments provide a method, for example, to generate a user experience based on a knowledge engine. The method includes receiving from a server associated with a knowledge engine: a first tabular user interface (UI) view to generate a calculation graph; a second tabular UI view to generate a completeness graph; and a third tabular UI view to generate a client UI view. The method further includes receiving input data from a user for the first, second, and third tabular UI views. The method further includes providing the input data to the server to generate the calculation graph, the completeness graph, and the client UI view. The method further includes receiving real-time feedback of the input data to the first, second, and third tabular UI views. The method further includes receiving an instance of the client UI view. The method further includes confirming the instance of the client UI view.

Other embodiments provide systems to perform the aforementioned methods to increase efficiency and accuracy of a user experience based on a knowledge engine. Additionally, other embodiments provide non-transitory computer-readable storage mediums comprising instructions for generating a user experience based on a knowledge engine.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 depicts an example user interface for generating a calculation graph, according to an embodiment.

FIG. 3 depicts an example user interface for generating a completeness graph, according to an embodiment.

FIG. 4 depicts an example user interface for generating a client user interface view, according to an embodiment.

FIG. 5 depicts an example user interface for editing artifact file(s), according to an embodiment.

FIG. 6 depicts an example user interface for testing, according to an embodiment.

FIGS. 7A-7C depict example user interfaces of the user experience, according to an embodiment.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
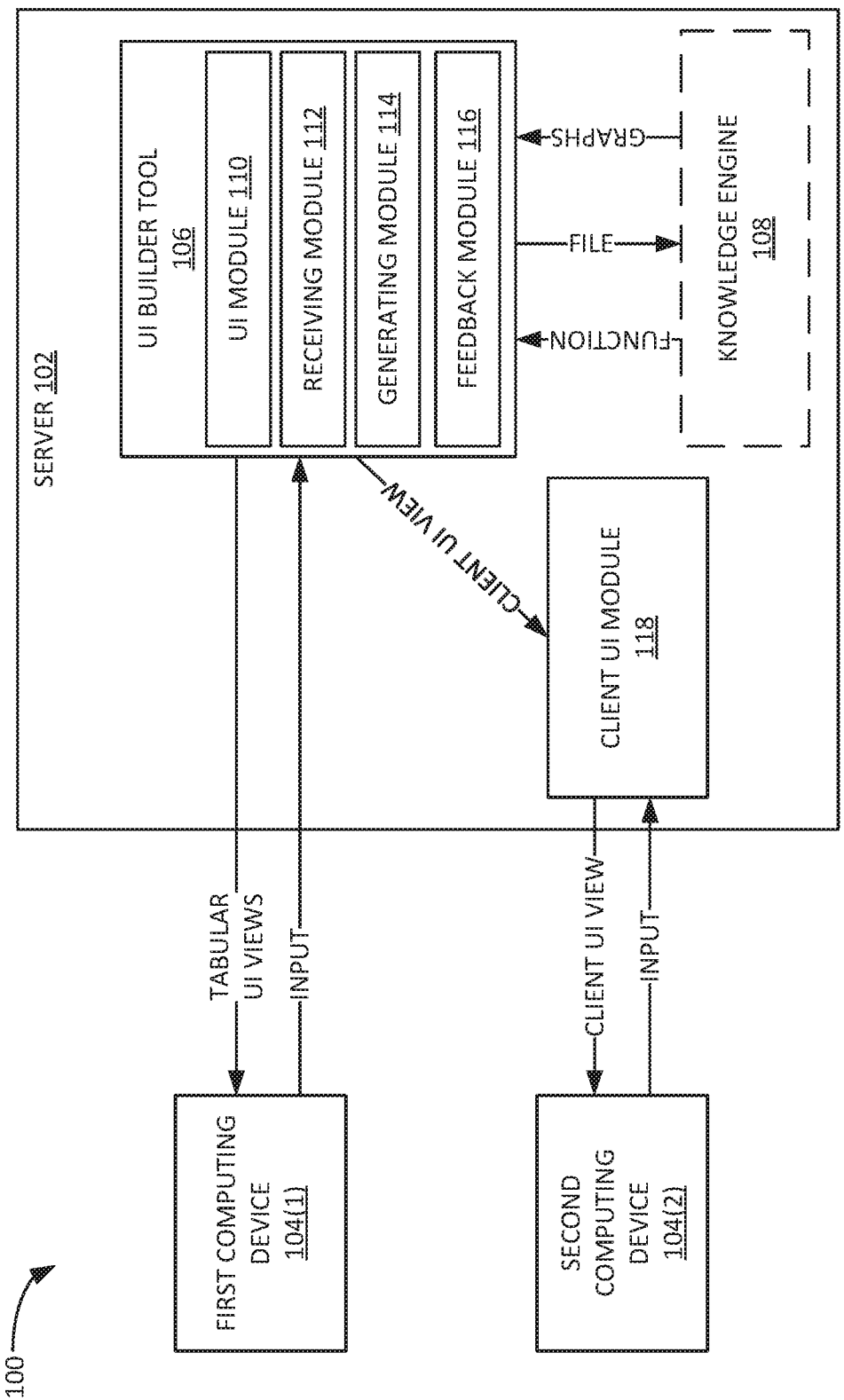
FIG. 1 depicts an example computing environment, according to an embodiment.

Aspects of the present disclosure provide apparatuses, methods, processing systems, and computer readable mediums for generating a user experience based on a knowledge engine.

In order to generate a user experience for a software program product, developers (e.g., individuals, organizations, etc.) can utilize a user interface (UI) builder tool. The UI builder tool can be hosted by a server to which the developer can access and/or connect to via a computing device. The UI builder tool can provide a set of UI views to a computing device of the developer. In some cases, the set of UI views can be tabular. Each UI view can be accessed via a single window by selecting a tab, button, or other selection element that is located within the window, indicating a separate UI view. In other cases, the set of UI views can each be in a separate window, and each window displayed simultaneously on a computing device.

With the set of UI views, the computing device can receive input data from the developer to generate the user experience for the software program product. For example, in the instance of a software program product that represents a compliance regime of rules and regulations, if the developer is attempting to add and/or modify the user experience with new rules and regulations, the set of UI views can break down the type of input. Based on the new rules and regulations, the developer can utilize a first UI view for generating a calculation graph, another UI view for generating a completeness graph, and a third UI view for generating a client UI view.

In some cases, upon receiving input data from the computing device, the UI builder tool can generate a set of artifacts (e.g., artifact file(s)). For example, the artifact files can include an XML, file, a JSON file, etc. The set of artifacts can include data, based on the input data, that defines the calculation graph(s), the completeness graph(s), and the client UI view(s). The UI builder tool can generate the set of artifacts based on the knowledge engine. The knowledge engine can include calculation graphs and completeness graphs representing the current status of the compliance regime (e.g., within the nodes of the graphs). Further, the knowledge engine can include data structures, operations, data types, etc., of calculation graphs and completeness graphs that the UI builder tool can utilize in generating the artifact files. For example, operations from the knowledge engine can be included as part of the tabular UI views provided to the developer computing device. In another example, the UI builder tool can use the data types and data structures of the knowledge engine to validate the input data representing the calculation and/or completeness graph(s) in the set of artifact files.

In one example, after the UI builder tool generates the set of artifact files, the UI builder tool can store the files in a database with a unique identifier. The UI builder tool can then provide the unique identifier to the knowledge engine, which can then retrieve the artifact files that define the calculation graph(s) and the completeness graph(s). Upon retrieving the artifact files, the knowledge engine can generate and/or execute the calculation graph and the completeness graph as defined in the corresponding artifact files. The UI builder tool can generate the client UI views based on the input data. The client UI view can be a template UI for a client user to enter data. In such cases, the data entered by the client user can be stored separately on a server for privacy, data protection, etc. of user data.

With the calculation graph(s), completeness graph(s), and client UI view(s) generated by the UI builder tool and/or knowledge engine, an instance of the client UI view can be provided to the developer computing device to confirm the user experience generated.

Once the client UI view is generated and confirmed by the developer computing device, the UI builder tool can provide the client UI view to other computing devices that attempt to access the new user experience. For example, the client UI view can be provided to all computing devices hosting an instance of the software program product as a software update. In another example, if the software program product is not hosted on a computing device, the new client UI view is provided upon a computing device accessing the new client UI view (e.g., on a server hosting the software program product).

Rather than manually generate a new user experience from scratch, which requires in depth knowledge of not only the new (or modified) subject matter to be included but also the programming code to generate the user experience, the UI builder tool abstracts the actual generation of the user experience from the computing device. In particular, the UI builder tool provides a set of UI views for a logic-driven collection of input data with real-time feedback provided to users. The UI builder tool then generates an artifact based on the input data, which can be used to generate the user experience (e.g., via a knowledge engine service). The developer can test and confirm via the UI builder tool the user experience prior to providing the user experience to users, for example, of the software program product.

Example Computing Environment

FIG. 1 depicts an example computing environment 100 for generating a user experience.

As illustrated, the example computing environment 100 includes a server 102 interacting with one or more computing devices 104 (e.g., first computing device 104(1) and second computing device 104(2)). The server 102 can include a user interface (UI) builder tool 106, a knowledge engine 108, and a client UI module 118.

A computing device 104 can include a computer, laptop, tablet, smartphone, a virtual machine, container, or other computing device with the same or similar capabilities. In some cases, the computing device 104 can be associated with a developer of a software program product. The developer can via the computing device 104 (e.g., a first computing device 104(1)) generate a user experience for a client user of the software program product. For example, the first computing device 104(1) can access and/or receive tabular UI views from a UI builder tool 106 in a developer and/or editing application for the software program product. Through the tabular UI views, the developer can input the data for generating a user experience that the server 102 can generate and provide to client users of the software program product. The client user can use another computing device 104 (e.g., a second computing device 104(2)) to access the software program product. In some cases, the developer and the user can use the same computing device.

The server 102 can also include a knowledge engine 108. The knowledge engine 108 can include calculation graphs and completeness graphs representing rules and regulations of a knowledge domain for generating result(s). For example, in a tax knowledge domain, the calculation and completeness graphs can represent the rules and regulations for generating tax values, such as a tax refund, number of dependents, taxable deductions, and so forth. A software program product can utilize the data stored in a knowledge engine 108 (e.g., calculation and completeness graphs) to provide user experiences, such as filing tax returns electronically. In some cases, the knowledge engine 108 can be hosted on one or more servers 102. In other cases, the server 102 can include a knowledge engine service that accesses the server(s) hosting the knowledge engine 108.

A knowledge domain is not static, and therefore, to accurately reflect the current state of the knowledge domain, a knowledge engine 108 can be updated to provide added and/or modified user experiences in a software program product based on the current knowledge domain.

In one embodiment, a UI builder tool 106 of the server 102 can provide a set of tabular UI views to a first computing device 104(1) (e.g., associated with the developer) to add and/or modify a user experience in a software program product. The UI builder tool 106 can include a UI module 110, a receiving module 112, a generating module 114, and a feedback module 116.

The UI module 110 can generate the tabular UI views. In some cases, the UI builder tool 106 provides the tabular UI views to the first computing device 104(1). In other cases, the first computing device 104(1) remotely accesses the tabular UI views at the server 102. For example, the developer application for generating the user experience for a software program product can be hosted at the computing device 104 or at the server 102.

The tabular UI views generated by the UI builder tool 106 (e.g., via the UI module 110 or generating module 114) can include a set of initialization scripts. The initialization scripts included with (e.g., embedded in) the tabular UI views can include data from the knowledge engine 108, such as operations (e.g., functions) that can be selected by the first computing device 104(1) for defining calculation graphs. With the tabular UI views, the first computing device 104(1) can receive input data from a user (e.g., a developer of the user experience in a software program product).

The input data can define the calculation graph in a first tabular UI view, a completeness graph in a second tabular UI view, and a client UI view in a third tabular UI view of the user experience on a client computing device.

The input data entered into the first tabular UI view that generates a calculation graph can include a plurality of node descriptions that represent the nodes and at least one operation (e.g., from the knowledge engine 108). The operation selected defines the relationship between the plurality of nodes in the calculation graph. For example, a user can define a first node with a node description as "Initial number" and include in the description the type of data to be entered during the user experience and example of the data. The user can define a second node with a node description as "Plus 1" and include in the description the type of data (e.g., a constant value of 1) to be part of the user experience with the example value also entered as input data. In a third node, the user can include a description and definition of the relationship between the first two nodes by an operation. As described above, the operation can be an operation from the knowledge engine 108 that is included in the first tabular UI view as a selection option. The nodes of the calculation graph can be chained together to perform more than one operation. An example of the input data entered in a first tabular UI view is illustrated in FIG. 2.

The input data entered into a second tabular UI view that generates a completeness graph can include the node descriptions of each node for the calculation graph to carry out an operation (e.g., each required and/or conditional node). An example of the input data entered in a second tabular UI view is illustrated in FIG. 3.

The input data entered into a third tabular view that generates a client UI view includes field names, titles, messages, etc., to be displayed on the client UI view along with the corresponding node based on the node descriptions. An example of the input data entered in a third tabular UI view is illustrated in FIG. 4.

In some cases, the input data is entered into a table format (e.g., a truth table), a decision tree format, etc.

The UI builder tool 106 receives the input data from each tabular UI view. For example, the input data can include user entered data as well as selected operations of the knowledge engine 108. In some cases, the operations can be selected (e.g., by a user of the first computing device 104(1)) based on a dropdown menu with operations from the knowledge engine 108 as options. The receiving module 112 can receive the input data after a selection is made at the first computing device 104(1) to generate the client UI view. For example, the first computing device 104(1) can receive an indication from any tabular UI view to submit the input data. When the first computing device 104(1) receives an indication to submit the input data to the UI builder tool 106, the first computing device 104(1) initiates a POST request to the UI builder tool 106.

After the receiving module 112 receives a POST request with input data from the first computing device 104(1), the feedback module 116 can provide feedback to the first computing device 104(1) for generating the client UI view for the user experience on the software program product. The feedback module 116 can provide message notifications to the first computing device 104(1). For example, the message notification can indicate an error in the input data and a suggestion to correct and/or modify the input data.

In some cases, the receiving module 112 can receive the input data in real-time as the input data is entered on the first computing device 104(1). In such cases, the UI builder tool 106 can provide real-time feedback via the feedback module 116 of the UI builder tool 106. For example, if a user is entering an operation to a tabular UI view, then the feedback module 116 can offer a suggestion to the user (e.g., via a notification on the first computing device 104(1)). In another example, if the user entered the incorrect data type to a tabular UI view, then the feedback module 116 can generate an alert to the user. The feedback module 116 can access the knowledge engine 108 to provide feedback to the first computing device 104(1) and/or validate operations, data type, data structure, etc. included in the input data.

In one embodiment, once the UI builder tool 106 receives the input data, the generating module 114 can generate the set of artifacts defining the calculation graphs, completeness graphs, and the client UI view. For example, the generating module 114 can generate a set of artifact files (e.g., an XML, file, JSON file, etc.). The set of artifacts can define the calculation graph, completeness graphs, and the client UI view as a programming code, including but not limited to a domain specific language.

The UI builder tool 106 can use the knowledge engine 108 to generate the artifacts. With the input data received from the first computing device 104(1), the generating module 114 of the UI builder tool 106 can include an algorithm that reviews the input data (e.g., the operations, dependencies, etc.) from the tabular UI views. For example, a row (e.g., row 6) in the tabular UI view generating a calculation graph can include input data with the following knowledge engine (KE) operation from the knowledge engine 108: KE SUM (F4, F5)=F6. With this row input, the generating module 114 of the UI builder tool 106 can determine with the knowledge engine 108 that the input defines a calculation graph where F4 and F5 are input nodes and F6 is the calculation node that will run the knowledge engine operation. Further, the UI builder tool 106 can also validate the input data with knowledge engine 108, including the data structure, operations, data types, etc. of the knowledge engine 108.

After the generating module 114 generates the set of artifact files with the knowledge engine 108, the set of artifact files can be stored in a database with a unique identifier.

The UI builder tool 106 can then provide the unique identifier to the knowledge engine 108 (or a knowledge engine service), which can then retrieve the associated artifact files. Upon retrieval of the artifact files, the knowledge engine 108 can generate and/or execute the calculation graph and the completeness graph. The UI builder tool 106 can receive, for example, the data structure of the generated and/or executed calculation graph and completeness graph from the knowledge engine 108. The UI builder tool 106 (e.g., generating module 114 and/or UI module 110) can generate the client UI views based on the input data and artifact files.

The instance of the client UI view can represent the user experience for a user of a software program product to experience. The UI builder tool 106 can provide the calculation graph and completeness graph back to the first computing device 104(1) as a set of artifact files. Each artifact file can be edited and/or modified by an editing tool associated with the computing device (e.g., as part of the developer application or a separate application). The editing tool can include SPARK Editor or other editing tools capable of editing the artifact file. In some cases, the artifact file can be stored in a database with the unique identifier, and the first computing device 104(1) can retrieve the artifact file from the database for review, editing, etc., based on the unique identifier. In other cases, the UI builder tool 106 can provide the artifact files to the first computing device 104(1) with the client UI instance for review and/or modification.

In some cases, the instance of the client UI view can be provided to the first computing device 104(1) for review and/or confirmation by the first computing device 104(1). If the instance of the client UI view accurately reflects the input data, the first computing device 104(1) (e.g., via a user) can confirm the client UI view is accurate. Upon receiving confirmation, a client UI module 118 of the server 102 can provide the client UI view to a second computing device 104(2) that is a client of the software program product to implement the user experience generated. In other cases, if the developer is not satisfied with the client UI view, then the developer (e.g., via the first computing device 104(1)) can modify the artifact file(s) and/or the tabular UI views to generate a revised client UI view.

Example User Interface for Generating a Calculation Graph

FIG. 2 depicts an example user interface 200. The user interface 200 is one of the tabular UI views from the set of tabular UI views provided from a server to a computing device.

As illustrated, this particular user interface 200 includes a table for a user to enter input data regarding a calculation graph (e.g., how to perform a new and/or modified operation) for the user experience of the software program product. For example, in the user interface 200, each column indicates a type of data and operation to be performed within the user experience being generated. Each row includes data input by a user for generating the calculation graph for the user experience. The data entered into each row and column can represent a description of the node or an operation to be performed by the node(s) to generate a result, as part of the user experience. In some cases, the user input can define a calculation graph with more than one operation.

The first two columns (e.g., "role" and "type") indicate the type of data associated with generating a calculation graph for the user experience. The user interface 200 provides a column for any additional options included for the user to enter data. Further, the user interface 200 includes columns for the names associated with the data (e.g., "friendly name (display name)" and "field (internal)"). Further, the user interface 200 includes a column for input regarding the operation to be performed (e.g., "expression (calculation)"). In some cases, the rows within the column regarding operations can include a dropdown menu that includes a list of operations from the knowledge engine that are embedded within the user interface 200.

There are additional columns illustrated indicating the types of input data collected by the user interface 200 for generating the user experience, including "Explanation Debugger," "Question Debugger," and "Author Explanation." The columns illustrated are examples and other types of data can be requested within the user interface 200 for generating the calc graph as part of the user experience.

In addition, FIG. 2 illustrates how a user interacting with user interface 200 can access a different tabular UI view. For example, as depicted, the user interface 200 can include a set of tabs, where each tab at the bottom of the user interface 200 can include a link to the respective tabular UI view for the user to access and input data. For example, the "Calculation" tab can represent user interface 200 for generating the calculation graph. The "Completeness" tab can represent user interface 300 of FIG. 3 as described herein for generating the completeness graph. The "UX" tab can represent user interface 400 of FIG. 4 as described herein for generating the client UI view. In other cases, the user interface 200 can include buttons or links within the user interface 200 for the selection to access a different user interface in the set of tabular UI views available.

Further, FIG. 2 also illustrates that user interface 200 can provide access to a user for help by displaying a link and/or a button within the user interface 200 (e.g., "For help go to this sheet!")).

In some cases, when the user is entering input data to user interface 200 (or user interface 300 of FIG. 3 or user interface 400 of FIG. 4), the server can provide real-time feedback to the computing device. For example, when the server provides the tabular UI views, the tabular UI views can include scripts and/or add-ons based on the knowledge engine. In one case, if the user is entering an operation from the knowledge engine, the user interface 200 can autofill the calculating operation to perform based on the letters entered into the field.

Example User Interface for Generating a Completeness Graph

FIG. 3 depicts an example user interface 300. The user interface 300 is one of the tabular UI views from the set of tabular UI views provided from the server to a computing device (e.g., of a developer).

As illustrated, this particular user interface 300 includes a table for a user to enter input data regarding a completeness graph for a software program product. The input data regarding the completeness graph can relate to the required and/or conditional data defined in user interface 200 of FIG. 2 for generating the calculation graph. For example, in the user interface 300, a first column can include input data representing the type of data (e.g., corresponding to a data field name in a column of user interface 200 of FIG. 2). A second column can include a representation of a rule associated with the type of data (e.g., whether the data is required or optional).

Similar to FIG. 2, the user interface in FIG. 3 also illustrates how a user interacting with user interface 300 can access a different tabular UI view (e.g., via tabs, links, and/or buttons in the user interface). The size, location, and placement of the tabs, links, and/or buttons to access other user interfaces can be consistent among all of the tabular UI views. In some cases, the size, location, and placement the tabs, links, and/or buttons to access other user interfaces can vary.

Example User Interface for Generating a Client User Interface View

FIG. 4 depicts an example user interface 400. The user interface 400 is one of the tabular UI views from the set of tabular UI views provided from the server to a computing device (e.g., of a developer).

As illustrated, this particular user interface 400 includes a plurality of columns for a user to input information regarding a client UI view. For example, the first column depicts "nodeid," referring to a field name corresponding to the name entered in user interface 200 of FIG. 2. Another column indicates the type of data corresponding to the "nodeid." FIG. 4 illustrates the data that will appear in the client UI view, including the title of the screen (e.g., "Hello World!" and "Congrats") as well as a subtitle (or label) that describes the screen ("What's the number you want to add 1 to? We'll do the heavy lifting!" and "Here's the result of your number+1: $$(NumberPlusOne)"). The placeholder "$(NumberPlusOne)" refers to the result calculated based on operations and inputs entered in user interface 200 of FIG. 2 with the input entered into user interface 300 of FIG. 3 to generate a completeness graph to ensure that the result generated and displayed is calculated with all necessary data.

With the user interfaces 200 of FIG. 2, 300 of FIG. 3, and 400 of FIG. 4, a computing device provides the user with the capability to switch between different tabular UI views when building the user experience. When the user has completed input to each tabular UI view and in some cases, reviewing real-time feedback regarding the calc graph(s), the completeness graph(s), and the client UI view, the computing device can send the input to the server. The user can indicate via any of the tabular UI views that the data entered is ready to publish (e.g., by selecting a button, link, and/or tab in any tabular UI view).

At the server, the input data from the tabular UI views can be extracted. A calc graph and a completeness graph can be generated via a knowledge engine. Further, the client UI view instance can be generated and provided to the computing device of the developer for review and confirmation before the server provides the client UI view to other computing devices to provide the user experience generated.

Example User Interface for Editing Artifact File(s)

FIG. 5 depicts an example user interface 500 that displays the artifact generated by the server. The artifact is a file generated via the UI builder tool (as described in FIG. 1) based on the input provided in the tabular UI views and represents the calc and completeness graphs.

The artifact is received from the server, and the coding language of the artifact representing the calc and completeness graphs can be stored as an XML file, a JSON file, or other similar file format. The computing device can edit the coding language of the artifact. For example, a user can interact with the coding language displayed in the right panel of the user interface. The computing device, via the user interface 500, can receive revision(s) to the naming convention, type of input, type of operation, etc., associated with a calc graph, as illustrated in FIG. 5. The computing device can also edit and/or modify the completeness graph.

In some cases, the computing device can edit the XML, file in the same developer application used to input data to the tabular UI views. For example, the developer application can access an editing tool or have an editing tool built into the application to edit and/or modify the coding language. In other cases, the artifact can be stored in a database and accessed by a computing device via an editing tool.

In some cases, edits and/or modifications to the coding language can be saved (e.g., to the XML file) and perpetuated to the tabular UI views that are accessible via the same developer application. The XML file can be saved to a database, associated with the server.

Example User Interface for Testing

FIG. 6 depicts example user interface 600 for testing the calculation graph. While the user interface 600 illustrates testing of a calculation graph, the user interface 600 is not limited to testing calculation graph(s) and can test completeness graph(s) as well.

As illustrated in user interface 600, each column represents a test case. The number of test cases can depend on the user. In some cases, the user interface 600 is tabular, but the user interface 600 is not limited to a tabular format.

The user interface 600 depicts a "TestCaseID," "Description," "Parameters," and "Topic" rows. These rows are exemplary rows depicting various data types for describing the test case. The user can enter corresponding information to the rows. In some cases, the data entered into the "TestCaseID," "Description," "Parameters," and "Topic" rows can be metadata for the artifact file. In addition, there can be more or fewer rows describing a test case.

For testing the calculation graph, the user interface 600 illustrates a set of rows associated with "Inputs" and a set of rows associated with "Asserts." As depicted row 6 illustrates a heading for "Inputs" with inputs such as "/KE/textarea/InputNumber" extracted from the user interface 200 of FIG. 2. Further, as depicted row 10 illustrates a heading for "Asserts" includes asserts such as "/KE/textarea/NumberPlusOne" extracted from the user interface 200 of FIG. 2. The assert can refer to the operation selected by the user to initiate as part of the calculation graph. The inputs and asserts (as well as the description of the test case) are not limited to the rows depicted.

The inputs and asserts are extracted from the user interface 200 of FIG. 2 based on a set of rules that reviews the inputs and asserts and determines which inputs and asserts to extract from the user interface 200 of FIG. 2 and enter to user interface 600. In some cases, the user interface 600 is provided with the set of tabular interfaces for generating the calculation graph, the completeness graph, and the client UI view. In such cases, the inputs and asserts are extracted by the UI builder tool as the user enters the input and/or assert to the respective user interface (e.g., from the user interface 200 of FIG. 2 or from the user interface 300 of FIG. 3). In other cases, the user interface 600 is provided to the developer with the artifact file. In such cases, the UI builder tool extracts the input and/or assert when generating the artifact file.

Once the inputs and/or asserts are extracted and entered to the user interface 600, the user can generate test case(s). The user can generate as many or as few test cases as they would like by entering test parameters to each row. For example, in test case 1 (illustrated in column B as "Pass1" description), the user can enter 10 as the input and 11 as the result of initiating the operation of input value plus one (e.g., 10+1=11). This test case can illustrate an instance of a passing test associated with the calculation graph inputs and asserts from the user interface 200 of FIG. 2. The user interface 600 can also test instances of a failing test associated with the calculation graph, as illustrated in column D. In the instance of a failing test, the user interface 600 can also display the reason for the failing test once the test case status is determined.

In some cases, the pass/fail status is determined automatically as the user enters data to the test case column. In other cases, the pass/fail status of a test case is determined based on a selection of the user (e.g., via a button, link, etc.) in the user interface 600 to initiate the test cases.

Example User Interfaces of the User Experience

FIGS. 7A-7C depict user interfaces 700, 720, and 740 displayed, respectively, on a client computing device. The user interfaces 700, 720, and 740 illustrate the user experience that is generated based on the set of tabular UI views and the generated artifacts, as described in FIGS. 2-5.

As illustrated in FIG. 7A, a user interface 700 is displayed on a client computing device. The user interface 700 includes a title message and/or prompt (e.g., "Hello World! What's the number you want to add 1 to? We'll do the heavy lifting?") that is displayed to a user. The title message and/or prompt displayed in the user interface 700 corresponds to the input of the third tabular UI view, as described in FIG. 4.

As illustrated in FIG. 7B, a user interface 720 is displayed on the client computing device. The user interface 720 includes input received from the user (e.g., "10") in response to the initial title message and/or prompt.

As illustrated in FIG. 7C, a user interface 740 is displayed on the client computing device. The user interface 740 includes an output result generated by the execution of a calculation graph and a completeness graph (e.g., "11"). The calculation graph and completeness graph to generate the result is defined in the set of tabular UI views. For example, as described above, FIGS. 2 and 3 illustrate defining the calculation and completeness graphs respectively for the user experience.

Example Method of Generating a User Interface

Figure 8:
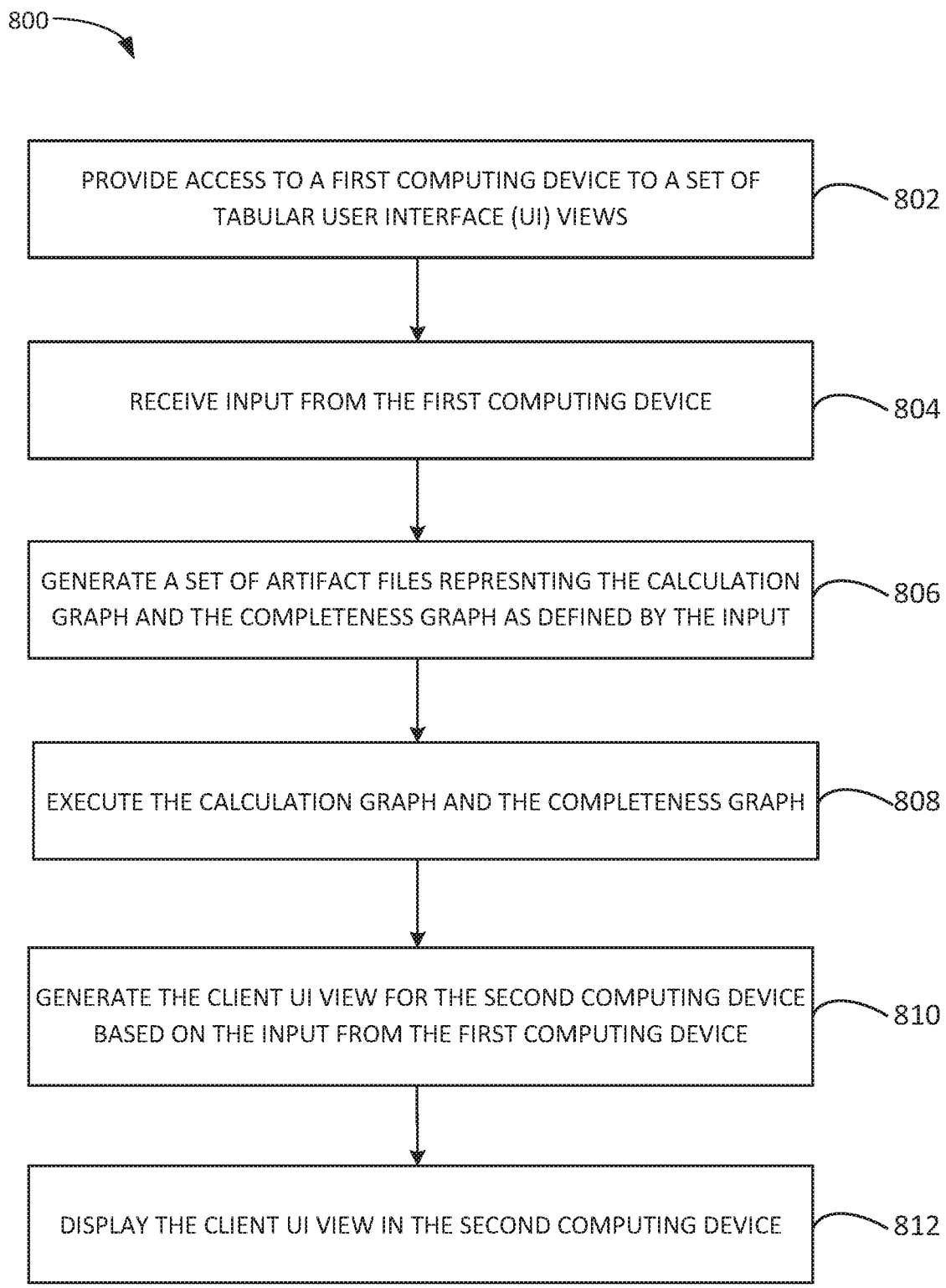
FIG. 8 depicts an example method of generating a user interface, according to an embodiment.

FIG. 8 depicts an example method 800 of generating a user interface, as described with respect to FIGS. 1-5.

At 802, a server provides access to a first computing device to a set of tabular UI views. The set of tabular UI views can include a first tabular UI view to generate a calculation graph, a second tabular UI view to generate a completeness graph, and a third tabular UI view to generate a client UI view. In some cases, the server can transmit the set of tabular UI views via an application. The application can be hosted on the first computing device or the server.

At 804, the server receives input from the first computing device. For example, for each tabular UI view provided to the computing device, the server can receive input data to generate the calculation graph, completeness graph, and the client UI view.

The input data includes a first input, a second input, and a third input. The first input can be from a first tabular UI view to generate a calculation graph. The first input data can include a plurality of node descriptions and selection of one or more operations. Operations corresponding to a knowledge engine can be loaded and/or embedded in the first tabular view (e.g., in an initialization script) for selection. The operation(s) selected can define the relationship between the nodes based on the node descriptions. Other first input data can include type of data (e.g., variable, constant, alphabetic, numeric, etc.) defining the calculation graph.

The second input can be from a second tabular UI view to generate a completeness graph. The second input can include an identification (e.g., based on the node description) of each node (e.g., required and/or conditional) of the calculation graph to carry out an operation defined in the first input.

The third input can be from a third tabular UI view to generate a client UI view for a client computing device. In some cases, the computing device providing the input data can also be the same computing device that receives the client UI view after inputting data. For example, the developer can use a developer specific application to add and/or modify the user experience of a software program product. After generating the user experience, the developer can access the software program product from the same computing device and to access the new and/or modified user experience.

In some cases, the server can provide real-time feedback to the first computing device based on the input data received from the first computing device. For example, if the incorrect data type or format is received from the first computing device from a first tabular UI view, the server can generate and provide a notification indicating as such (e.g., data type error) to the first computing device.

At 806, the server generates a set of artifact files representing the calculation graph, the completeness graph, and the client UI view as defined by the input data, as described in FIG. 1.

At 808, the server executes the calculation graph and the completeness graph, as described in FIG. 1. For example, a knowledge engine or knowledge engine service associated with the server can retrieve the respective artifact files generated at 806 and generate and/or execute the calculation graph and the completeness graph.

At 810, the server generates the client UI view for the second computing device, based on the input from the first computing device.

In some cases, prior to generating the client UI view for the second computing device, the server can generate an instance of the client UI view for the first computing device to review. For example, the server can generate the instance of the client UI view as real-time feedback to the first computing device. Based on the real-time feedback (e.g., the instance of the client UI view), the server can receive updated input data via the first, second, or third tabular UI view. In turn, the server can update the artifact generated corresponding the updated input data.

At 812, the server can display the client UI view in the second computing device.

In some cases, the server can receive input from the second computing device that displays the client UI view. Based on the input received from the second computing device, the calculation graph and completeness graph are executed to generate a result. The server can provide the result of the execution of the calculation graph and the completeness graph to the second computing device as an update to the client UI view, as described in FIGS. 7A-7C.

Example Method of Generating a User Interface

Figure 9:
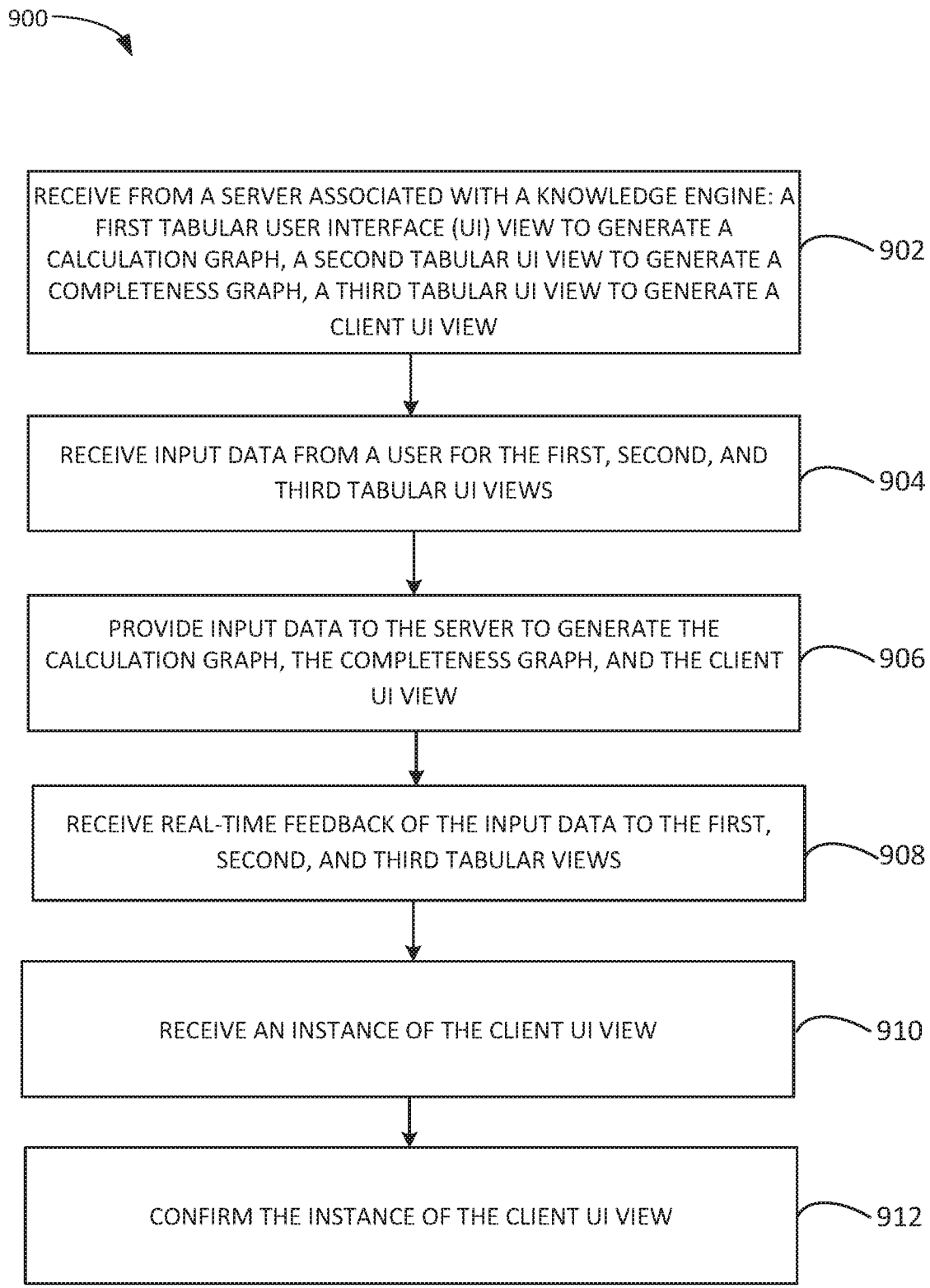
FIG. 9 depicts an example method of generating a user interface, according to an embodiment.

FIG. 9 depicts an example method 900 of generating a user interface, as described with respect to FIGS. 1-5.

At 902, a computing device receives from a server associated with a knowledge engine a set of tabular UI views, including a first tabular UI view to generate a calculation graph, a second tabular UI view to generate a completeness graph, and a third tabular UI view to generate a client UI view.

In some cases, the computing device can display a single tabular UI view at a time. Each tabular UI view can be separately displayed on the computing device based on user-selection. For example, the computing device can display the first tabular UI view to generate a calculation graph, and then the computing device can display the second tabular UI view or the third tabular UI view based on a user selection. Further, as the computing device receives input data from the user via a tabular UI view, the computing device can also receive an indication from the user to display a different tabular UI view from which the computing device can then receive additional input data.

In other cases, the computing device can display each tabular UI view in a window and display multiple windows to the user to interact with (e.g., to receive input data, display feedback, display client UI view instance, etc.). In this case, rather than displaying one tabular UI view, the computing device can display each tabular UI view to the user.

At 904, the computing device receives input data from a user for the first, second, and third tabular UI views.

At 906, the computing device provides the input data to the server to generate the calculation graph, the completeness graph, and the client UI view.

At 908, the computing device receives real-time feedback of the input data to the first, second, and third tabular views.

In some cases, the computing device can receive an indication of whether there are any issues with the input data as the input data is being entered. For example, if the incorrect format of input data is entered by a user, the computing device can receive a notification of the error from the server and provide the notification to the user. In other cases, after the input data is provided to the server, the computing device can receive real-time feedback indicating that input data is missing. Based on the notification of error provided to the user, the computing device can receive updated input data, which in turn can be provided to the server to generate an updated client UI view.

At 910, the computing device receives an instance of the client UI view. For example, based on the input data provided to the server, a UI builder tool can generate the client UI view, as described in FIG. 1.

In some cases, the computing device receives a set of artifact files from the server. The artifact file(s) includes programming code representing the calculation graph and the completeness graph generated based on the input data. The computing device can display an artifact. In some cases, the computing device can receive input that updates and/or modifies the artifact. For example, a user reviewing the artifact can update and/or modify the programming code. Based on the update and/or modification received, the computing device can provide the update and/or modification to the server to generate an updated client UI view. Further, the update and/or modification received by the computing device can be perpetuated to the respective tabular UI views.

In some cases, the computing device can test the calculation and/or completeness graphs as described in FIG. 6.

At 912, the computing device confirms the instance of the client UI view. For example, the instance of the client UI view can be displayed to a user for review. If the user is satisfied with the client UI view, then the user can indicate as such to the computing device. In turn, the computing device can confirm the client UI view to the server. By doing so, the computing device indicates to the server that the client UI view can be provided to client computing devices.

Example Server

Figure 10:
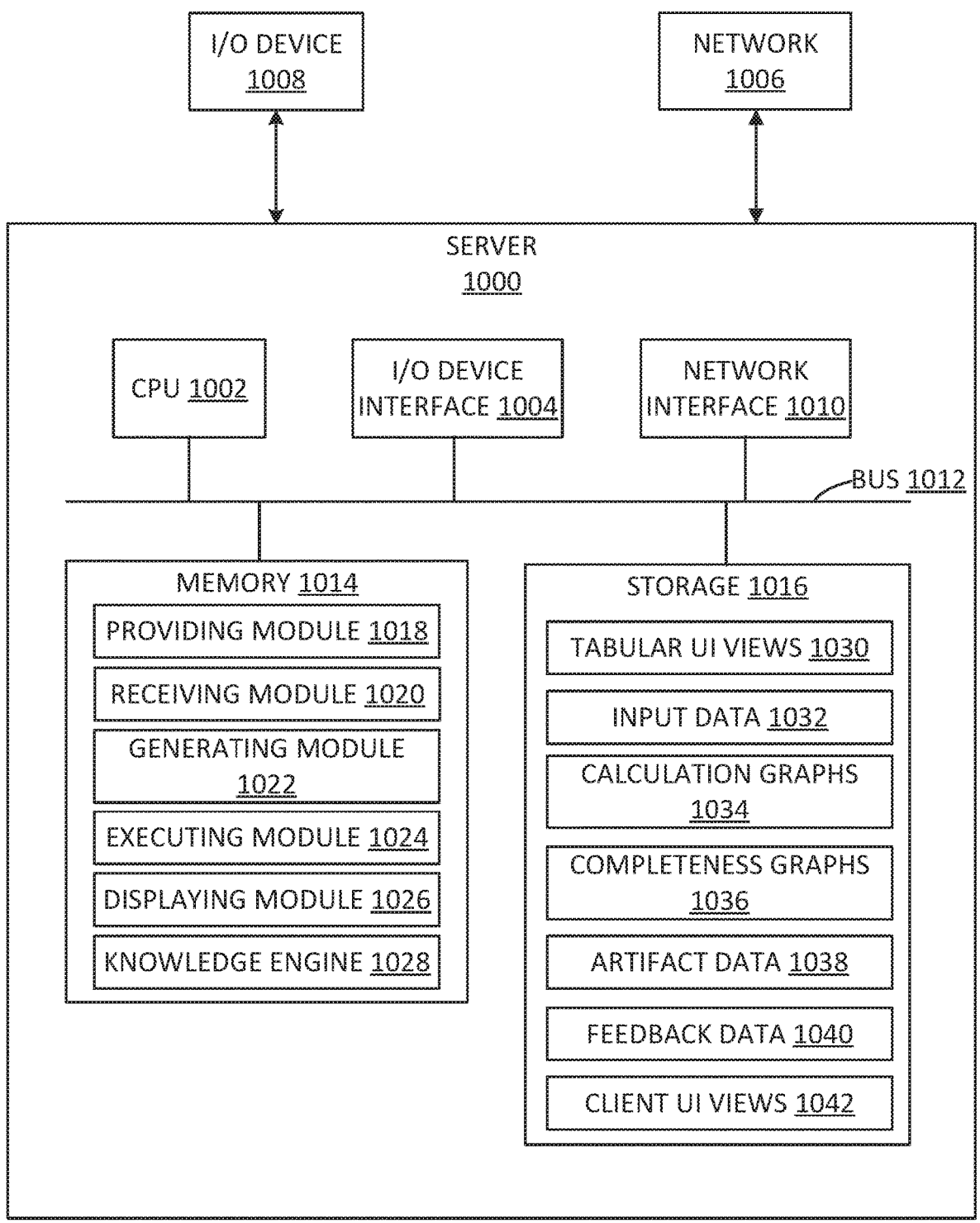
FIG. 10 depicts an example server, according to an embodiment.

FIG. 10 depicts an example server 900 that may perform the methods described herein, for example, as described with respect to FIGS. 1, 8, and 9. For example, the server 1000 can be a physical server or a virtual (e.g., cloud) server and is not limited to a single server that performs the methods described herein, for example, with respect to FIGS. 1, 8, and 9.

Server 1000 includes a central processing unit (CPU) 1002 connected to a data bus 1012. CPU 1002 is configured to process computer-executable instructions, e.g., stored in memory 1014 or storage 1016, and to cause the server 1000 to perform methods described herein, for example, with respect to FIGS. 1, 8, and 9. CPU 1002 is included to be representative of a single CPU, multiple CPUs, a single CPU having multiple processing cores, and other forms of processing architecture capable of executing computer-executable instructions.

Server 1000 further includes input/output (I/O) device(s) 1008 and interfaces 1004, which allows server 1000 to interface with input/output devices 908, such as, for example, keyboards, displays, mouse devices, pen input, and other devices that allow for interaction with server 1000. Note that server 1000 may connect with external I/O devices through physical and wireless connections (e.g., an external display device).

Server 1000 further includes a network interface 1010, which provides server 1000 with access to external network 1006 and thereby external computing devices.

Server 1000 further includes memory 1014, which in this example includes a providing module 1018, a receiving module 1020, a generating module 1022, an executing module 1024, a displaying module 1026, and a knowledge engine 1028 for performing the operations as described in FIGS. 1, 8, and 9.

Note that while shown as a single memory 1014 in FIG. 10 for simplicity, the various aspects stored in memory 1014 may be stored in different physical memories, but all accessible by CPU 1002 via internal data connections such as bus 1012.

Storage 1016 further includes tabular UI views 1030, which may include a set of tabular UI views provided to a computing device to generate a client UI, as described in FIGS. 1-8.

Storage 1016 further includes input data 1032, as described in FIGS. 1-8. The input data 1026 may include data input to the set of tabular UI views from a computing device generating the client UI. The input data may further include data input to the client UI.

Storage 1016 further includes calculation graphs 1034, which may include calculation graphs generated by the server based on input from a set of tabular views of a computing device, as described in FIGS. 1-8.

Storage 1016 further includes completeness graphs 1036, which may include completeness graphs generated by the server based on input from a set of tabular views of a computing device, as described in FIGS. 1-8.

Storage 1016 further includes artifact data 1038, which includes artifact data, as described in FIG. 5.

Storage 1016 further includes feedback data 1040, which includes feedback data generated and provided to a computing device generating a client UI with the set of tabular UI views (e.g., in real time), as described in FIG. 1.

Storage 1016 further includes client UI views 1042, which includes client UI views generated by a computing device with a set of tabular UI views and displayed in a computing device (e.g., the same or different computing device that generated the client UI view), as described in FIGS. 1, 7A-7C, and 8-9.

While not depicted in FIG. 10, other aspects may be included in storage 916.

As with memory 1014, a single storage 1016 is depicted in FIG. 10 for simplicity, but various aspects stored in storage 1016 may be stored in different physical storages, but all accessible to CPU 1002 via internal data connections, such as bus 1012, or external connections, such as network interfaces 1004. One of skill in the art will appreciate that one or more elements of server 900 may be located remotely and accessed via a network 1006.

Example Computing Device

Figure 11:
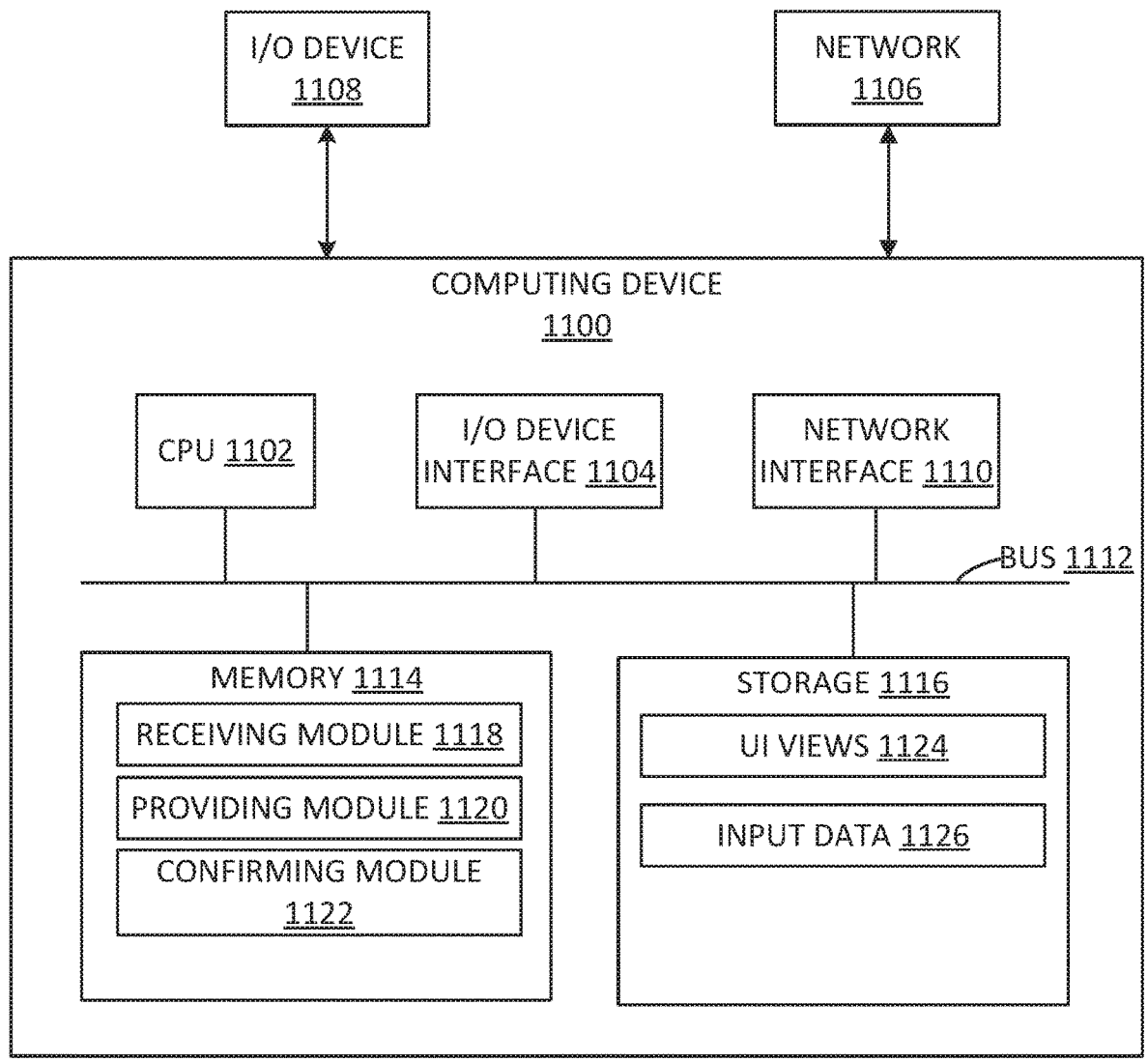
FIG. 11 depicts an example computing device, according to an embodiment.

FIG. 11 depicts an example computing device 1100 that may perform the methods described herein, for example, with respect to FIGS. 1, 8 and 9. For example, the computing device 1100 can be a computer, laptop, tablet, smartphone, a virtual machine, or other computing device with the same or similar capabilities (e.g., including generating a user interface and interacting with the user interface that was generated).

Computing device 1100 includes a central processing unit (CPU) 1102 connected to a data bus 1112. CPU 1102 is configured to process computer-executable instructions, e.g., stored in memory 1114 or storage 1116, and to cause the computing device 1100 to perform methods described herein, for example, with respect to FIGS. 8 and 9. CPU 1102 is included to be representative of a single CPU, multiple CPUs, a single CPU having multiple processing cores, and other forms of processing architecture capable of executing computer-executable instructions.

Computing device 1100 further includes input/output (I/O) device(s) 1108 and interfaces 1104, which allows computing device 1100 to interface with input/output devices 1108, such as, for example, keyboards, displays, mouse devices, pen input, and other devices that allow for interaction with computing device 1100. Note that computing device 1100 may connect with external I/O devices through physical and wireless connections (e.g., an external display device).

Computing device 1100 further includes a network interface 1110, which provides computing device 1100 with access to external network 1106 and thereby external computing devices.

Computing device 1100 further includes memory 1114, which in this example includes a receiving module 1118, a providing module 1120, and a confirming module 1122.

Note that while shown as a single memory 1114 in FIG. 11 for simplicity, the various aspects stored in memory 1114 may be stored in different physical memories, but all accessible by CPU 1102 via internal data connections such as bus 1112.

Storage 1116 further includes UI views 1124, as described in FIGS. 1-8. The UI views 1124 may include a set of tabular UI views for a computing device generating a client UI for a user experience. The UI views 1124 may further include a preview of the client UI view displayed to the computing device generating the client UI view. The UI views 1124 may further the client UI view that is displayed to a computing device for implementing a user experience.

Storage 1116 further includes input data 1126, as described in FIGS. 1-8. The input data 1126 may include data input to the set of tabular UI views from a computing device generating the client UI. The input data may further include data input to the client UI.

While not depicted in FIG. 11, other aspects may be included in storage 1116.

As with memory 1114, a single storage 1116 is depicted in FIG. 11 for simplicity, but various aspects stored in storage 1116 may be stored in different physical storages, but all accessible to CPU 1102 via internal data connections, such as bus 1112, or external connections, such as network interfaces 1104. One of skill in the art will appreciate that one or more elements of computing device 1100 may be located remotely and accessed via a network 1106.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   providing access to a first type of user via a first application to a set of tabular user interface (UI) views;
   receiving input from the first application, wherein the input includes:
      a first input from a first tabular UI view of the set of tabular UI views to generate a calculation graph including:
         a plurality of node descriptions; and
         a selection of one or more operations corresponding to operations in a knowledge engine representing a knowledge domain, wherein each operation defines a relationship between the plurality of node descriptions;
      a second input from a second tabular UI view of the set of tabular UI views to generate a completeness graph that includes each node of the plurality of node descriptions of the calculation graph to carry out an operation defined by the relationship; and
      a third input from a third tabular UI view of the set of tabular UI views to generate a client UI view for a second application;
   generating via the knowledge engine the calculation graph, the completeness graph, and the client UI view as defined by the input that includes:
      generating a set of artifact files that defines the calculation graph, the completeness graph, and the client UI view;
      validating the input in the set of artifact files for generating the calculation graph and the completeness graph based on the knowledge engine that includes data types and data structures; and
      updating the knowledge engine with the set of artifact tiles;
   generating the client UI view for a second type of user via the second application based on the input from the first application; and
   displaying the client UI view in the second application.

2. The method of claim 1, further comprising:
   receiving an input from the second application displaying the client UI view;
   executing the calculation graph and the completeness graph based on the input from the second application; and
   providing a result of the execution of the calculation graph and the completeness graph to the second application as an update to the client UI view.

3. The method of claim 1, further comprising: providing, via the first application, real-time feedback of the received input in the first tabular UI view.

4. The method of claim 3, wherein the real-time feedback includes a notification of an error associated with the received input including a data type error.

5. The method of claim 1, wherein each file in the set of artifact files includes an XML file, a JSON file, or a custom file.

6. The method of claim 1, further comprising:
receiving updated input data in the first tabular UI view, the second tabular UI view, or the third tabular UI view; and
updating at least one artifact file in the set of artifact files.

7. The method of claim 1, further comprising: executing a set of initialization scripts in the first tabular UI view.

8. A system comprising:
a processor; and
a memory storing instructions, which when executed by the processor perform a method comprising:
providing access to a first type of user via a first application to a set of tabular user interface (UI) views;
receiving input from the first application, wherein the input includes:
a first input from a first tabular UI view of the set of tabular UI views to generate a calculation graph including:
a plurality of node descriptions; and
a selection of one or more operations corresponding to operations in a knowledge engine representing a knowledge domain, wherein each operation defines a relationship between the plurality of node descriptions;
a second input from a second tabular UI view of the set of tabular UI views to generate a completeness graph that includes each node of the plurality of node descriptions of the calculation graph to carry out an operation defined by the relationship; and
a third input from a third tabular UI view of the set of tabular UI views to generate a client UI view for a second application;
generating via the knowledge engine the calculation graph, the completeness graph, and the client UI view as defined by the input that includes:
generating a set of artifact files that defines the calculation graph, the completeness graph, and the client UI view;
validating the input in the set of artifact tiles for generating the calculation graph and the completeness graph based on the knowledge engine that includes data types and data structures; and
updating the knowledge engine with the set of artifact tiles;
generating the client UI view for a second type of user via the second application based on the input from the first application; and
displaying the client UI view in the second application.

9. The system of claim 8, further comprising:
receiving an input from the second application the client UI view;
executing the calculation graph and the completeness graph based on the input from the second application; and
providing a result of the execution of the calculation graph and the completeness graph to an updated client UI view in the second application.

10. The system of claim 8, further comprising: providing, via the first application, real-time feedback of the received input in the first tabular UI view.

11. The system of claim 10, wherein the real-time feedback includes a notification of an error associated with the received input including a data type error.

12. The system of claim 8, wherein each file in the set of artifact files includes an XML file, a JSON file, or a custom file.

13. The system of claim 8, further comprising:
receiving updated input data in the first tabular UI view, the second tabular UI view, or the third tabular UI view; and
updating at least one artifact file in the set of artifact files.

14. The system of claim 8, further comprising: executing a set of initialization scripts in the first tabular UI view.

15. A method comprising:
receiving from a server associated with a knowledge engine:
a first tabular user interface (UI) view to generate a calculation graph;
a second tabular UI view to generate a completeness graph; and
a third tabular UI view to generate a client UI view;
receiving input data from a user for the first, second, and third tabular UI views, wherein the input data includes:
for the first UI view;
a plurality of node descriptions and a selection of one or more operations corresponding to operations in the knowledge engine representing a knowledge domain, wherein each operation defines a relationship between the plurality of node descriptions,
for the second UI view:
an identification of each node to carry out each selected operation; and
for the third UI view:
a field name and message corresponding to each node description;
displaying real-time feedback of the input data to the first, second, and third tabular UI views;
providing an instance of the client UI view; and
receiving confirmation of the instance of the client UI view.

16. The method of claim 15, further comprising:
receiving an indication of an error in the real-time feedback;
providing a notification of the error to the user;
receiving updated input data based on the notification; and
providing the updated input data to generate an updated client UI view.

17. The method of claim 15, further comprising: receiving a set of artifact files from the server, wherein the set of artifact files represents at least the calculation graph and the completeness graph in a programming code.

18. The method of claim 17, further comprising:
providing an update to at least one artifact file of the set of artifact files; and
receiving the update in a corresponding tabular UI view.

19. The method of claim 1, wherein each artifact file in the set of artifact files includes a unique identifier.

20. The system of claim 8, wherein each artifact file in the set of artifact files includes a unique identifier.

* * * * *